US007464004B2

(12) United States Patent
Das et al.

(10) Patent No.: US 7,464,004 B2
(45) Date of Patent: Dec. 9, 2008

(54) TROUBLESHOOTING TO DIAGNOSE COMPUTER PROBLEMS

(75) Inventors: Nicholas Das, Sammamish, WA (US); Jaydeep Singh, Sammamish, WA (US); John S. Green, Issaquah, WA (US); Keerti A. Rane, Bellevue, WA (US); Krishnaswamy J. Babu, Sammamish, WA (US); Raymond Arifianto, Sammamish, WA (US); Srikanth Malladi, Sammamish, WA (US); Suma SaganeGowda, Woodinville, WA (US); Tanvir Rahman, Mill Creek, WA (US); Toji T. Oommen, Sammamish, WA (US); Dale Edward Phurrough, Seattle, WA (US); Nayab Khan, Kenmore, WA (US); Pramod Kamalakar Walvekar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 11/377,997

(22) Filed: Mar. 17, 2006

(65) Prior Publication Data

US 2007/0220036 A1    Sep. 20, 2007

(51) Int. Cl.
*G06F 11/00*    (2006.01)

(52) U.S. Cl. ...................................................... 702/188
(58) Field of Classification Search .................. 702/188
See application file for complete search history.

(56) References Cited

U.S. PATENT DOCUMENTS 7,117,113 B1 *  10/2006  Baekelmans et al. ......... 702/123

\* cited by examiner

*Primary Examiner*—Bryan Bui
*Assistant Examiner*—Stephen J Cherry
(74) *Attorney, Agent, or Firm*—Vierra Magen Marcus & DeNiro LLP

(57) ABSTRACT

In a support service for computing devices or software (or other service), a determination is made based on an incident report that additional data is needed. A first template is chosen from a set of templates and that chosen first template is customized for the particular incident to create a data collection plan. The data collection plan includes a set of data collection items. The data collection plan is forwarded to a user client device associated with the incident report. At the user client device, a user can choose to proceed with all or a subset of the data collection items. Data is then collected for the selected data collection items. The user is then provided with the opportunity to select which of the collected data to upload back to the support service. The collected data is then uploaded, and the incident status is updated and made available.

13 Claims, 10 Drawing Sheets

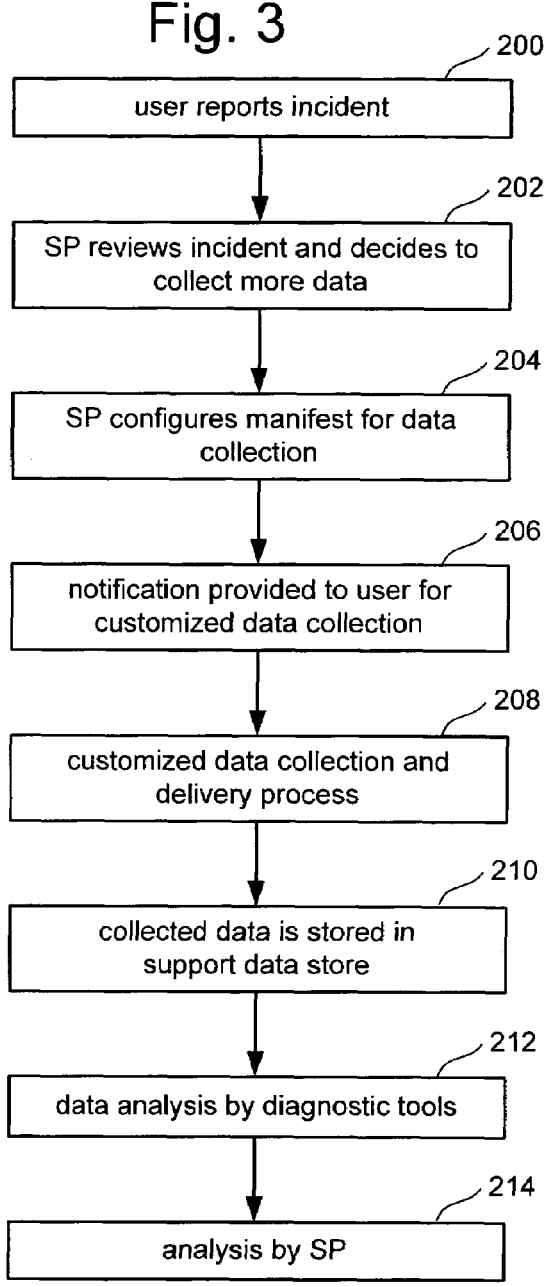
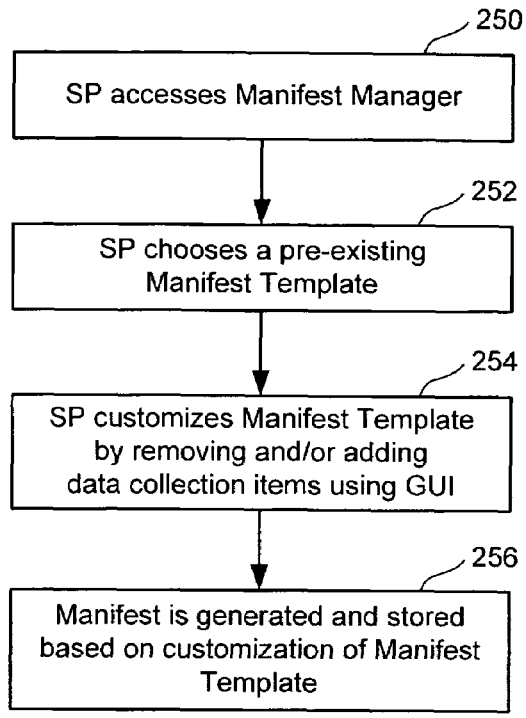
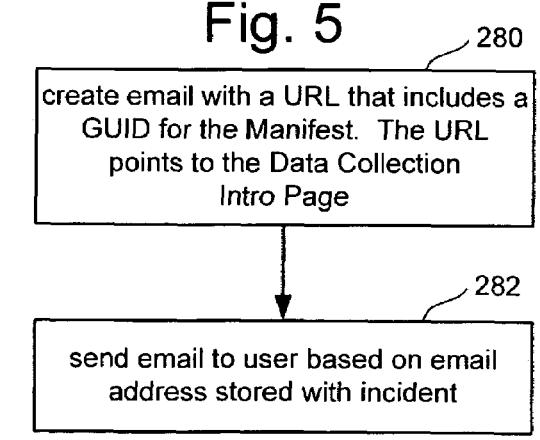

TROUBLESHOOTING TO DIAGNOSE COMPUTER PROBLEMS

BACKGROUND

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting, information gathering, etc. For example, a computing system interfaced to the Internet, by way of wire or wireless technology, can provide a user with a channel for nearly instantaneous access to a wealth of information and services.

As computing devices become more popular and more complex, the need for support has increased. Current computing systems may comprise a set of interacting hardware and software components. When one of these components is not functioning properly, a user may need to contact a support professional to diagnose and solve the problem. One difficulty is that the support professional is typically remote from the malfunctioning computing device; therefore, the support professional may not have access to all of the information necessary to diagnose the problem.

A prior attempt to remedy the above described situation has included a system that allows a support professional to choose a predefined data collection plan best suited for the problem to be diagnosed. That chosen predefined data collection plan and a predefined set of tools are downloaded to the malfunctioning computing device. Data is then collected according to the predefined data collection plan and uploaded back to the support professional for analysis by the support professional. This system has increased the effectiveness of the support professional. However, in some cases (e.g., situations not experienced previously by the support service), the support professional is still not able to get all of the necessary information to diagnose a particular problem because of limitations with the predefined data collection plans.

SUMMARY

A technology is described for downloading and using customized data collection plans and tools to obtain data for diagnosing computer problems.

As part of a support service (or other service), a determination can be made based on an incident report that additional data is needed to diagnose a problem with a computing device. A first template is chosen from a set of templates and that chosen first template is customized for the particular incident to create a data collection plan. The data collection plan includes a set of data collection items. The data collection plan is forwarded to a user client device associated with the incident report. At the user client device, a user can choose to proceed with all or a subset of the data collection items. Data is then collected for the selected data collection items. The user is then provided with the opportunity to select which of the collected data to upload back to the support service (or other service).

One embodiment includes customizing a data collection plan for a particular situation on a client device and transmitting the customized data collection plan toward a location for the client device. Another embodiment includes receiving a data collection plan, customizing the data collection plan, and collecting data based on the customized data collection plan. In one example of an implementation, an operating system for a computing device includes diagnostic code that facilitates downloading of one or more diagnostic tools and a data collection plan, as well as uploading of diagnostic data obtained in accordance with the data collection plan and/or by the diagnostic tools.

The technology described herein can be implemented using processor readable software that is stored on a processor readable storage device and executed using a processor. Alternatively, the technology can be implemented in hardware, or a combination of hardware and software, designed to carry out the methods described herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a flowchart describing one embodiment of a process for downloading tools to diagnose computer problems.

FIG. 4 is a flowchart describing one embodiment of a process for configuring a manifest.

FIG. 5 is a flowchart describing one embodiment of a process for providing a notification to a user.

DETAILED DESCRIPTION

As part of a support service for computer hardware or software (or other service), a determination is made based on an incident report that additional data is needed to diagnose a problem with a computing device (or other device). A manifest template is chosen from a set of manifest templates that best fits the problem trying to be diagnosed. The manifest templates identifies a set of data to collect and a set of tools to use to help obtain data. The manifest template is customized for the particular incident to create a manifest. The manifest identifies the data collection items for the particular problem at issue.

The user associated with the incident report is notified that the additional data is sought and provided with the opportunity to download the manifest and the tools. Using the downloaded tools and manifest, data is collected on the computing device having the problem. The collected data is uploaded to the support service. The user of the computing device having the problem is provided with an opportunity to select whether some of the data in the manifest is not collected and/or not uploaded back to the computing support service. In one embodiment, the user can only select whether all of the data or none of the data is uploaded back to the computing support service.

Figure 1:
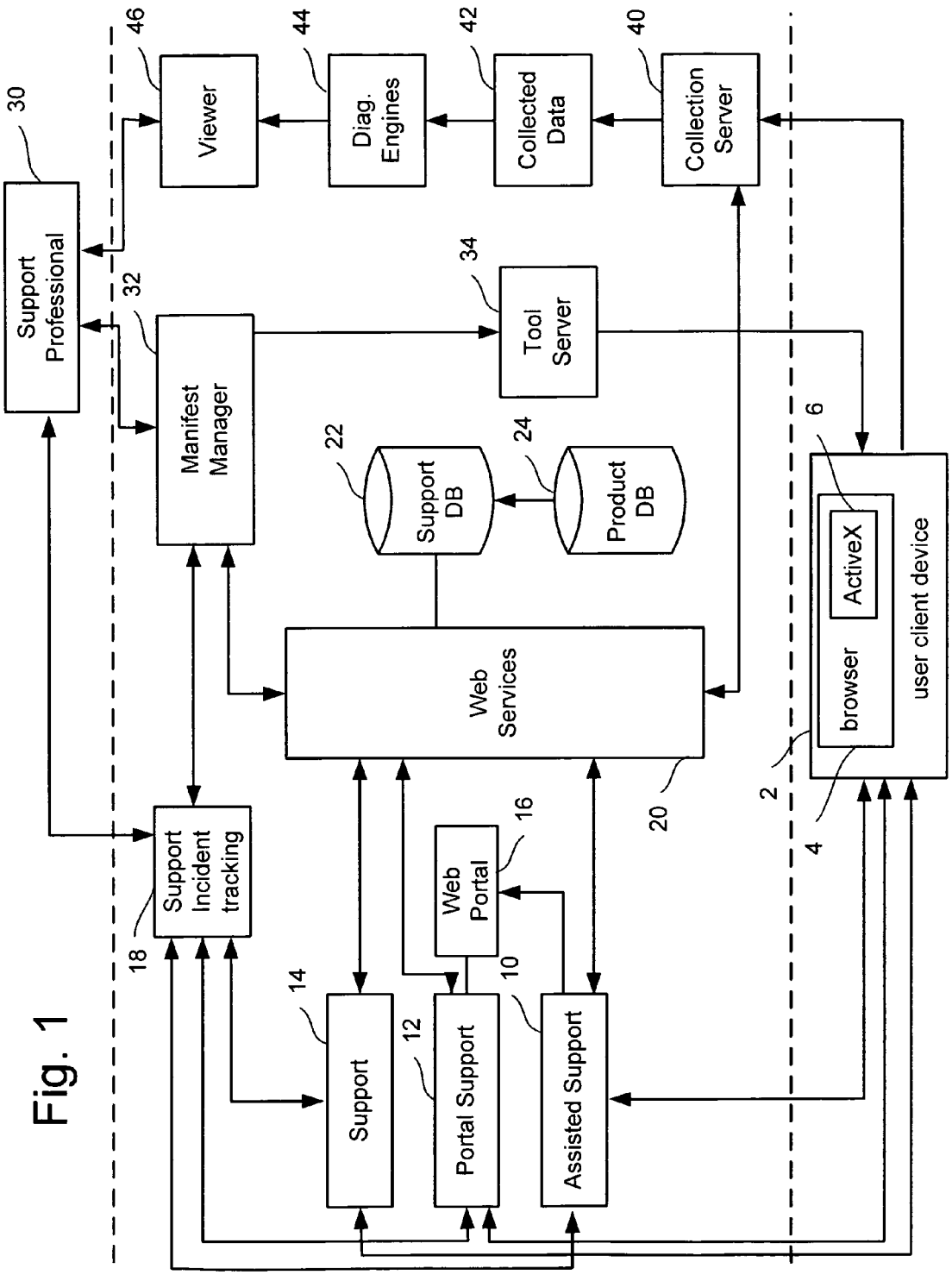
FIG. 1 is a logical block diagram of one embodiment of a system that provides for the downloading of tools and a data collection plan to diagnose computer problems.

FIG. 1 depicts a logical block diagram of a system for downloading tools and a data collection plan to diagnose problems on user client device 2. In one embodiment, user client device 2 includes a browser which can be used to navigate on the Internet or other network. ActiveX Control code 6 operates within browser 4 to perform the downloading, uploading and data collection discussed herein.

The technology described herein can be used to provide support (hardware and/or software support) for computing systems. FIG. 1 shows three paths for obtaining support: Assisted Support service 10, Portal Support service 12, and General Support Service 14. Other means can also be used. In one embodiment, Assisted Support 10 is contemplated to be a support service in which a user has a support professional (SP) working with them. A user can also access Portal Support 12, which is used to provide support in conjunction with Web Portal 16. One example of a web portal is msn.com. Other web portals can also be used. Support Service 14 can be a support service used for various software or hardware components associated with user client device 2. Assisted Support 10, Portal Support 12 and/or Support 14 can include a number of different servers (including one or more web servers, one or more application servers, and one or more database servers, load balanced or not load balanced) used to perform the support service.

User client device 2 can communicate with Assisted Support 10, Portal Support 12, Support 14, and Web Portal 16. Assisted Support 10 and Portal Support 12 are in communication with Web Portal 16. The system also includes a Support Incident Tracking system 18 which can comprise a customer relations management system, a database system or other data storage solution to store support incidents. Assisted Support 10, Portal Support 12 and Support System 14 are in communication with Support Incident Tracking system 18. Assisted Support 10, Portal Support 12 and Support 14 are also in communication with Web Services 20. In one embodiment, Web Services 20 is used to provide various Internet communication services for the different support services. Web Services 20 is in communication with Support Database 22. Support Database 22 is used to store manifests (discussed below), manifest templates (discussed below), as well as tracking information for the various support incidents. Support Database 22 is in communication with Product Database 24. Product Database 24 is a database of all supported products for the system and a categorization of those products. For example, products can be categorized by product family or common issues.

User client device 2 is a computing device that can communicate with other devices. Any suitable computing device can be used, including a desktop computer, laptop computer, handheld computing device, PDA, telephone, etc. In one embodiment, user client device 2 will communicate with the various entities depicted in FIG. 1 via the Internet, another type of network, wireless communication, or other suitable means. Browser 4 can be any suitable browser or application that enables communication. One example of a suitable browser is Internet Explorer from Microsoft Corporation.

Support Professional 30 accesses the system using a computing device. Any suitable computing device can be used, including a desktop computer, laptop computer, handheld computing device, PDA, telephone, etc. Support professional 30 is in communication with Manifest Manager 32 and Viewer 46. Support Professional 30 uses Manifest Manager 32 to create new manifest templates, change existing manifest templates, delete existing manifest templates, create manifests from manifests templates, create data collection items, edit data collection items, and delete data collection items. Manifest Manager 32 is in communication with Tool server 34. Tool Server 34 stores tools associated with the manifests and facilitates downloading of those tools to user client device 2, as described below.

After viewing a support incident in Support Incident Tracking system 18, a support professional will choose a manifest template using Manifest Manager 32 and customize the chosen manifest template to create a manifest (a plan for collecting data) using Manifest Manager 32. The manifest, and tools identified by the manifest, will be downloaded to user client device 2. Data collected by the tools downloaded from tool server 34 and data collection according to a manifest will be uploaded to collection server 40 from user client device 2. In addition to receiving and facilitating the uploading of data, collection server 40 will also provide security by verifying a GUID (Globally Unique Identification) associated with the uploaded data. The uploaded data will be stored in collected data storage 42 and made available to various diagnostic engines 44. The various diagnostic engines 44 will access and analyze the collected data to help identify the problems on user client device 2 (or another device). A support professional 30 can then use Viewer 46 (application software providing a user interface) to view the results of diagnostic engines 44, configure diagnostic engines 44, employ diagnostic engines 44 and/or view the collected data to identify and solve the problems on user client device 2 (or another device). In some embodiments, less than all the components of FIG. 1 can be utilized. In other embodiments, additional components can also be utilized that are not depicted in FIG. 1, as necessary for the particular implementation.

Figure 2:
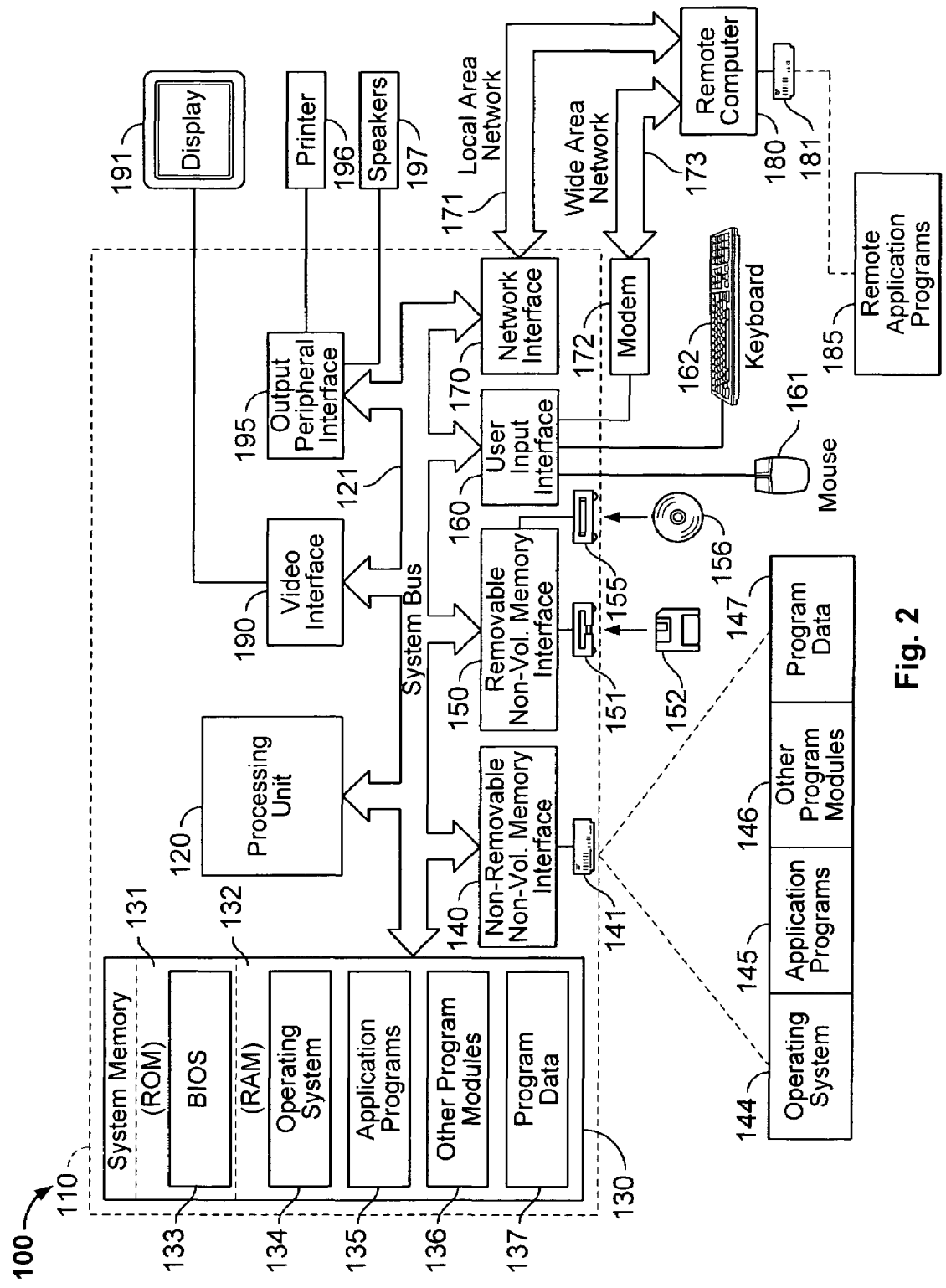
FIG. 2 is a block diagram describing one embodiment of a computing system.

FIG. 2 illustrates one example of a suitable general computing environment 100 that may be used to implement the various components illustrated in FIG. 1. For example, computing system 100 can be used to implement user client device 2; one or more of the servers for Assisted Support service 10, Portal Support 12, Support 14, Web Services 20, or Collection Server 40; or any of the other components illustrated in FIG. 1, separately or in combination. Computing system 100 is only one example of a suitable computing environment and is not intended to suggest any limitation as to the scope of use or functionality of the technology described herein. Neither should computing system 100 be interpreted as having any dependency or requirement relating to any one or combination of components illustrated in the exemplary operating environment 100.

The technologies described herein are operational with numerous general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 2, an exemplary system includes a general purpose computing device in the form of a computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data to program the processor(s) to perform the methods described herein. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Display 191 of system 100 depicted in FIG. 2 can include multiple monitors, 205, 206, 207, 208, 209, 210, 211, 212, 213, 214, 215, 216, 217, and 218. In one embodiment, the monitors are arranged in three rows and six columns; however, other arrangements can also be used. In addition, display 191 can include less than 18 monitors or more than 18 monitors. Each monitor can be the same size or different sizes. Monitors 201-218 can be any suitable size known or used in the art. The monitors can be LCD monitors, CRT monitors or other types of monitors. In one embodiment, each of the monitors 201-218 displays a different portion of the computer screen. In other embodiments, two or more of the monitors can overlap in displaying portions of the computer screen.

FIG. 3 is a flowchart describing one embodiment of a process for performing support services, including downloading tools and data collection plans to diagnose problems for computing devices. In step 200, a user reports a support incident. This could include a user accessing Assisted Support service 10, Portal Support service 12 or Support Service 14 of FIG. 1. It is contemplated that each of these support services will have a web page for a user to log a support incident. This web page will likely have one or more forms to fill out to identify the user, the user's machine, the product that is experiencing a problem and what the problem is. That support information provided by the user will be saved in Support Incident Tracking system 18, where it can be accessed by Support Professional 30. In step 202, Support Professional 30 will review the incident report and decide to collect more data. That is, the Support Professional will decide that more data is needed in order to diagnose what the problem is and how that problem should be fixed. In step 204, Support Professional 30 will configure a manifest for data collection. The system will include a set of preexisting manifest templates. One of these manifest templates will be used to create a manifest in step 204. The manifest will identify existing data to collect and tools to run to generate additional data. Step 204 includes the support professional customizing a manifest template for the particular problem being investigated. One embodiment allows for data collection using a default manifest before a support professional gets involved. Essentially the system allows for relevant data to be collected before hand to reduce support time.

In step 206, notification is provided to the user that there will be a customized data collection according to the particular manifest customized by the support professional. In one embodiment, a support professional can notify the user via telephone of the customized data collection. In another embodiment, the support professional can send an email notifying the user that there will be a customized data collection. Other means for notification can also be used. In one example, an email will be created that has a link back to Assisted Support service 10 to access a web page that provides access to the data collection process. In step 208, the customized data collection is performed and the data obtained is delivered to Collection Server 40. In step 210, the collected data is stored in the Collected Data Store 42. In step 212, the data is analyzed by the various diagnostic engines 44. In step 214, Support Professional 30 uses Viewer 46 to access the raw data and the results of diagnostic engines 44 in order to determine what the problem is and how to solve that problem.

FIG. 4 is a flowchart describing one embodiment of the process of configuring a manifest template to create a manifest, as part of step 204 of the process of FIG. 3. In one embodiment, a manifest template is an XML document which has information on the data collection items that need to be run/collected from a potential machine. The data collection items can be tools, executable files, data files and/or data values that are run/collected from user's machine. A manifest is a customized version (or instance) of a manifest template which is sent to the user. In one embodiment, a manifest is an XML document which identifies data collection items that need to be run/collected from the user's machine.

There can be many manifest templates. For example, there can be manifest template for each product or multiple manifest templates for each product. Manifest templates can be created by typing in an XML document manually or by using a software program with a user interface that aids a support professional to create a manifest template. In one embodiment, support professionals can have various roles which determine access permissions and capabilities for creating manifest templates. One example would include an administrator role, tester role and normal user role. The administrator is a support professional who has access to configure manifest templates, publish templates and create/publish data collection items. The administrator can also test manifest templates and data collection items. A tester can test manifest templates and data collection items, as well as publish manifest templates and data collection items. A normal user will have access to send manifests to users based on manifest templates. A support professional, with the proper access, will be able to create, edit and otherwise use manifest templates and data collection items using Manifest Manager 32.

The different data collection items that can be configured include (but are not limited to) files, WMI/WQL queries, registry values, tools, applications and utilities. Files include log files, INI files, or any file that already exists on the user's machine or exists after a tool/utility/application is run. As part of the data collection, the support professional might want to capture certain settings of the user's registry. Exact data would be configured according to the support professional. The tools/utilities/applications include tools or other software programs that create log files or other data output to which a support professional can use to debug certain problems. These tools are typically found on user's machine or would need to be downloaded from a support service 40 to the user's machine. They could be run with certain command line parameters and the output stored in a file. The data collection items that are created can be run on a specific OS/architecture or could be of the type that can run on any kind of system.

In some embodiments, manifest or manifest templates have attributes called conditionals which determine which kind of system the data collection items could run on. Conditionals like OS version and architecture are at the data collection level. Other conditionals can be at the manifest level. For example, registry setting value, registry setting existence, environmental variable value and environmental variable existence could all be at the manifest level.

FIG. 4 is a flowchart describing one example of a process for configuring a manifest template to create a customized manifest (see step 204 of FIG. 3). In step 250, support professional 30 accesses Manifest Manager 32. In step 252, support professional 30 chooses a preexisting manifest template from the set of manifest templates. In step 254, support professional will customize a manifest template by removing data collection items or adding data collection items using a graphical user interface (GUI). In step 256, a manifest is generated and stored based on the customization of the manifest template performed in step 254. The final manifest can be an XML file which identifies the data collection items or another format suitable for the particular implementation. Other suitable examples of formats for a manifest include a spreadsheet, database file, or other type of data structure.

Figure 6:
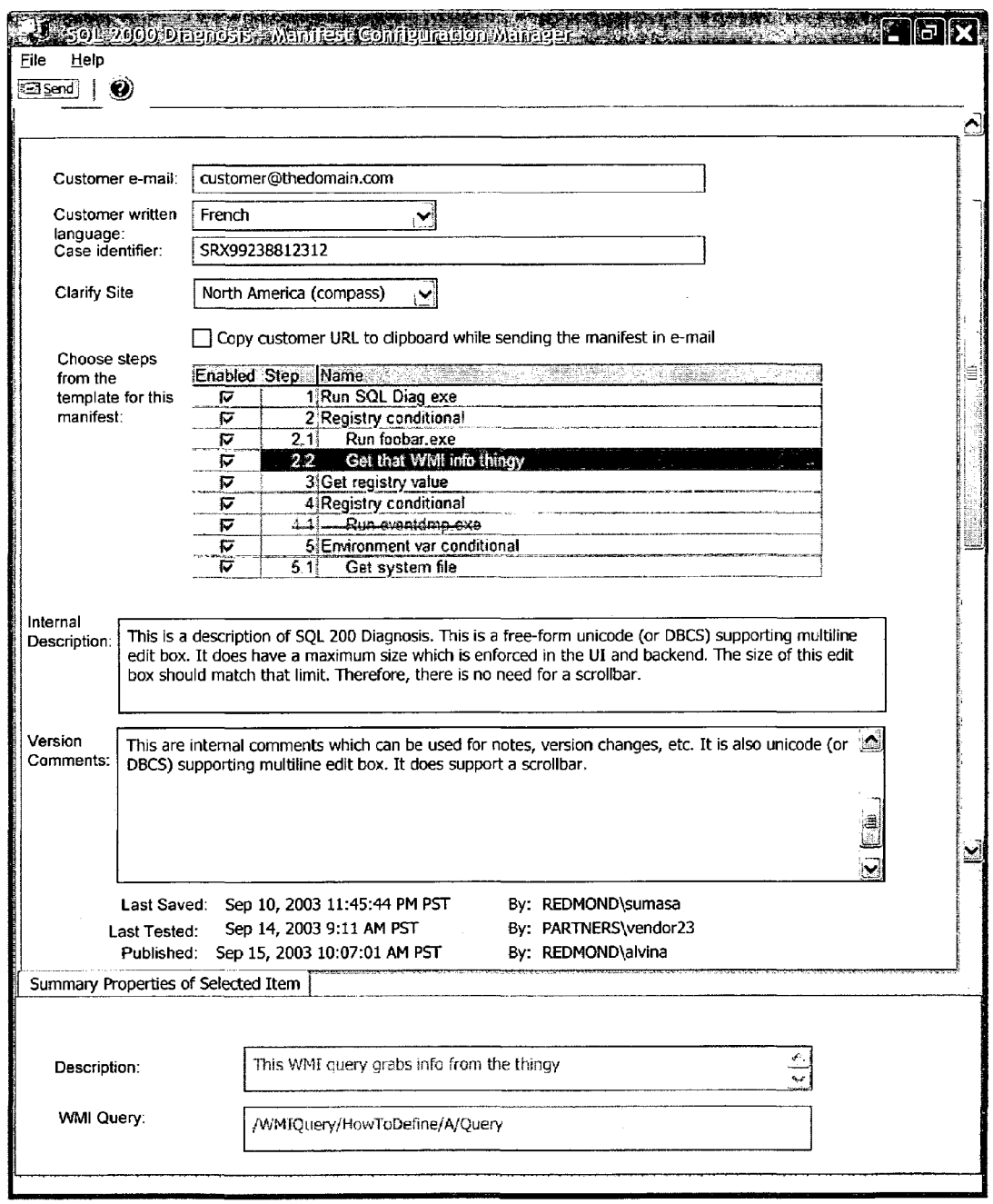
FIG. 6 depicts a user interface.

FIG. 5 is a flowchart describing one embodiment the process for providing notification to the user that a customized data collection process will be used as part of the support process. FIG. 5 describes one embodiment of step 206 of FIG. 3. In step 280, an email is created that is addressed to the email address used in the "Customer Email" field of the manifest or to an email address in the support incident stored in Support Incident Tracking system 18. The email will identify that a data collection process is needed for the support incident. The email will also include a URL that points to a data collection introduction page of Assisted Support service 10. In some embodiments, the URL will also include a GUID. In some embodiments, when a support incident is created, a GUID is created for that support incident. That GUID can be included in the customized template and/or in the URL FIG. 6 depicts a graphical user interface used to customize a manifest template in order to create a manifest. The interface of FIG. 6 includes various fields. The "Customer email" field identifies the email address of the customer who created the support incident and who will be receiving the manifest. The "Customer email" field is used in those embodiments where the customer is notified by email. The "Customer written language" field identifies the language read by the customer. In one embodiment, the manifest template can be created in many different languages.

The "Case identifier" is a number used to identify a particular support incident. In one embodiment, the case identifier could be a GUID associated with the support incident. In other embodiments, the case identifier can be another format or other type of identifying member. The "Clarify site" field depicted in FIG. 6 indicates the source of the support incident. This field is optional.

Underneath the "Clarify site" field is a table that shows the various data collection items. In this particular example, there are six data collection items and three conditional attributes. The table includes three columns. The first column is a check mark. If the check mark is checked, then the support professional wants that particular data collection item to remain in the final customized manifest. If the support professional removes the check, then when the manifest is created that particular data collection item will not be included. This is a way for the support professional to remove data collection items from the manifest template when creating a customized manifest. The manifest will list the data collection items to be utilized in the order by indicating steps. Each of the data collection items will also be named. In some embodiments, the support professional can drag and drop additional data collection items into the table or use the "File" drop down menu to select "Add new data collection item" in order to add a new data collection item to the table. In some embodiments, data collection items can be deleted, but not added. Below the table is an "Internal Description" used to describe the manifest template and "Version Comments" to describe information about the particular version of the template. When a particular data collection item is selected in a table, a description of the data collection item will be provided in the Summary Properties section of the user interface of FIG. 6. Additionally, if a particular data collection item is no longer available for use, it may be grayed out or have its text in strikethrough format. By deleting data collection items (removing the checkmark) or adding data collection items (drag and drop or use the "File" drop down menu), a manifest template is configured to create a customized manifest.

Figure 7:
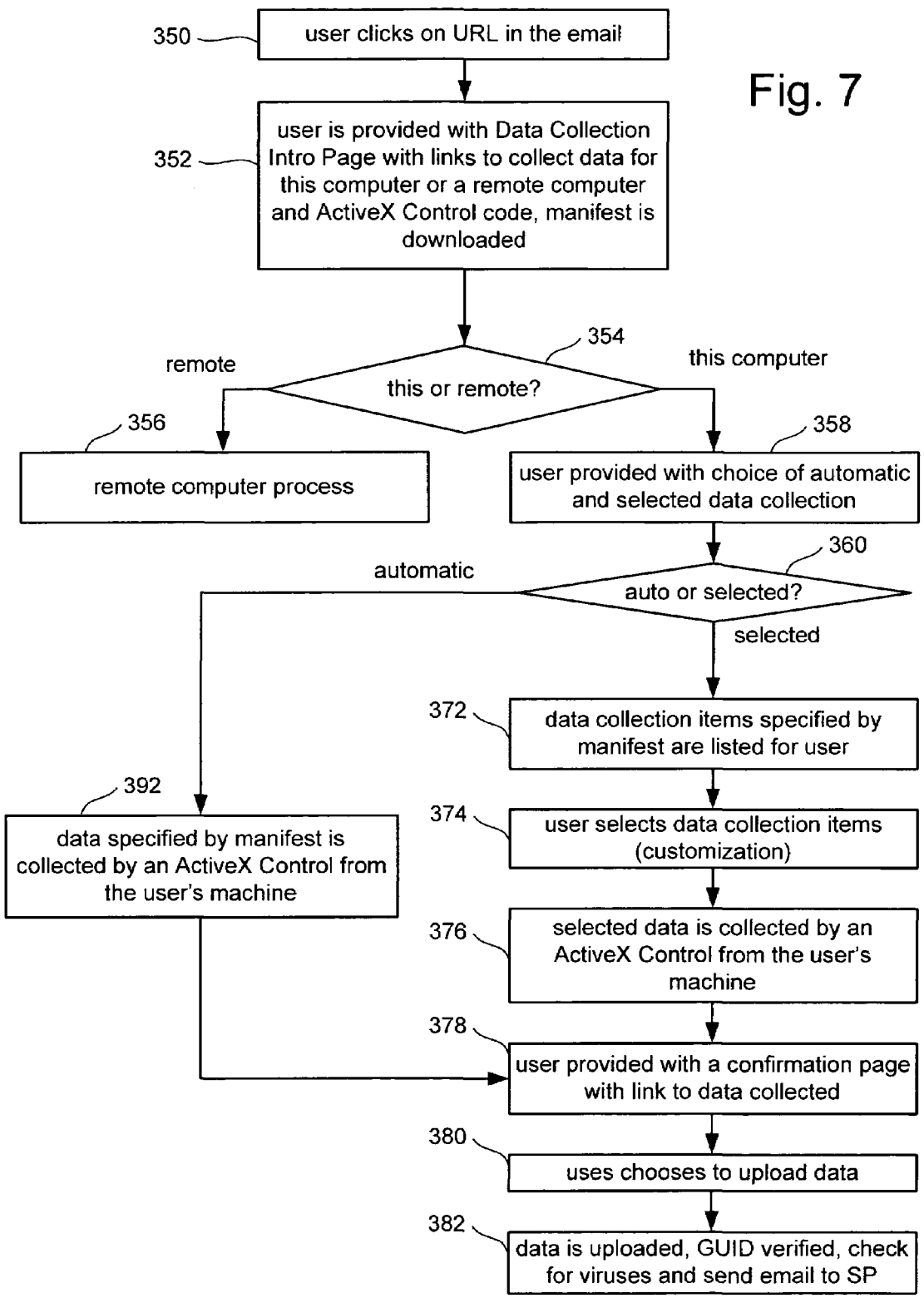
FIG. 7 is a flowchart describing one embodiment of a process for performing a customized data collection.

FIG. 7 is a flowchart describing one embodiment of performing the customized data collection and delivery process of step 208 of FIG. 3. The process of FIG. 7 is performed after the user receives the email notification from step 206 of FIG. 3. In step 350 of FIG. 7, the user clicks (or otherwise selects) the URL in the email. In response to clicking the URL, the user's browser 4 navigates (in step 352) the user to a data collection introduction page provided by a web server associated with Assisted Support service 10. That web page would ask the user whether the support incident is for the computer the user is currently using (local computer) or a different computer (remote computer). As part of step 352, when the data collection introduction page is loaded, ActiveX Control code 6 is also loaded into browser 4. The manifest is also downloaded at this time. The GUID for the support incident is also loaded with the ActiveX Control code. In one embodiment, the data collection introduction page will include a link to click on (or otherwise select) if the data collection is for the current computer the user is currently using and a link to click on (or otherwise select) if the data collection is for the remote computer. The user will select one of the links (step 354). If the user selected the remote computer link, then the remote computer process 356 will be performed (discussed below with respect to FIG. 9).

If the user selects the link to indicate that the data collection is for the current computer being used, then in step 358 the user is provided with the choice of whether the data collection should be done automatically or as selected by the user. If user chooses to select the data collection, then each of the data collection items will be listed to the user in a user interface in step 372. ActiveX Control 6 will review the manifest and identify all the various data collection items to be obtained/performed. The user will be given the opportunity to remove any of the data collection items, thereby customizing the data collection process. In other embodiments, the user may be provided an opportunity to add data collection items. In step 376, the selected data collection items are implemented by the ActiveX Control code 6 from the user's machine. That is, any files or data values that are to be obtained are accessed and stored in a data structure for uploading. Additionally, tools may be downloaded and/or run to obtain additional data. More details of step 376 are provided below with respect to FIG. 8. In step 378, the user is provided with a confirmation page to indicate the data which was obtained. It is possible that some of the data was not obtained because a particular tool or data value was not available. For each data value or set of values obtained, there will be a link so the user can click on the link and see the actual data value(s) obtained. In another embodiment, the user is provided with an identification of a path to the data so the user can access the data outside the application. In step 380, the user will be given the opportunity to choose which of the data values obtained will be uploaded to Collection Server 40 in step 382. In addition, the GUID is also uploaded with the data in step 382. In one embodiment, all the data is packaged into a .cab file. That .cab file is uploaded to Collection Server 40, where it is checked for viruses. Virus checking can also be performed by an external offline process. In addition, the GUID is verified to match a GUID stored with the particular manifests and/or the appropriate incident report. When data is successfully uploaded, an email is sent to Support Professional 30.

If, in step 360, it is determined that the user selected the data collection to be automatic, then in step 392 all the data specified by the manifest is collected by the ActiveX Control from the user's machine. After step 392, the process continues at step 378.

Figure 8:
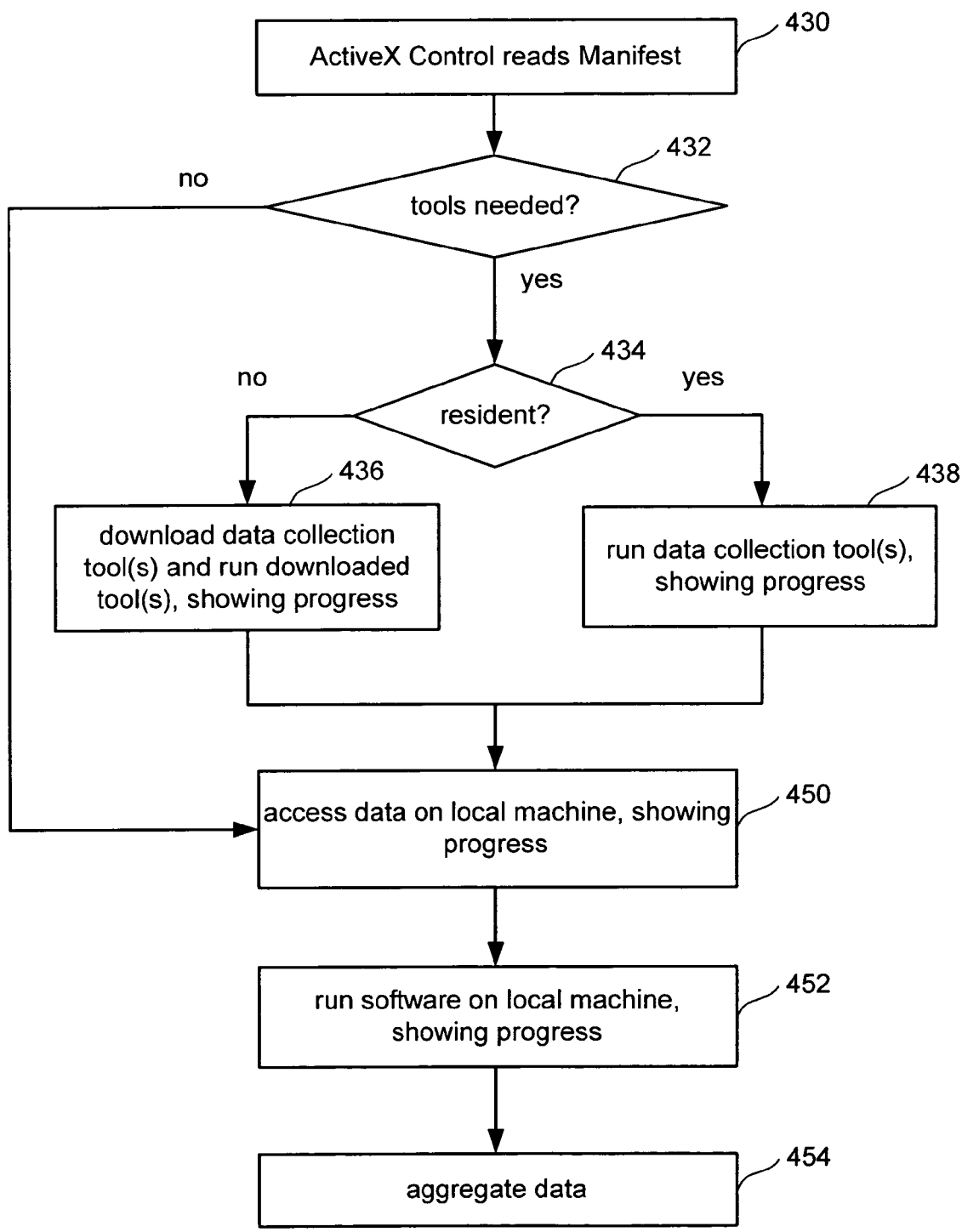
FIG. 8 is a flowchart describing one embodiment of a process for collecting data.

FIG. 8 is a flowchart describing one embodiment of the process for performing data collection, as part of steps 376 or 392 of FIG. 7. In step 430 of FIG. 8, ActiveX Control code 6 reads the manifest. If tools are needed (step 432) then it is determined whether the needed tools are resident in step 434 (e.g., already stored on the user client device 2). If some or all of the tools are resident, then the ActiveX Control code 6 runs the particular data collection tools that are resident. While those tools run, ActiveX Control will show the progress of the tools. Any tool that is not resident will be downloaded (step 436), and run upon being downloaded. When those tools are run by ActiveX Control code 6, the progress of tools will be depicted to the user. Thus, in some embodiments, steps 436 and 438 can be performed concurrently or serially. After running the tools in steps 436 and/or 438, any data on the local machine specified by the manifest (data files, data values, registry values, etc.) is obtained. While ActiveX Control code 6 is obtaining that data, ActiveX Control code 6 will show its progress to the user in step 450.

If no tools were needed (step 432), then steps 434, 436 and 438 are skipped and the process proceeds directly to step 450 where the appropriate data is accessed. After accessing the data in step 450, ActiveX Control code 6 may run various software applications on local machine 450 to obtain data. While running those applications, ActiveX Control code 6 will show its progress to the user. For example, if a particular application is broken, ActiveX Control code may attempt to run that application in order to obtain resulting data. In step 454, the data is aggregated. For example, the data can be stored in a .cab file or other data structure.

Figure 9:
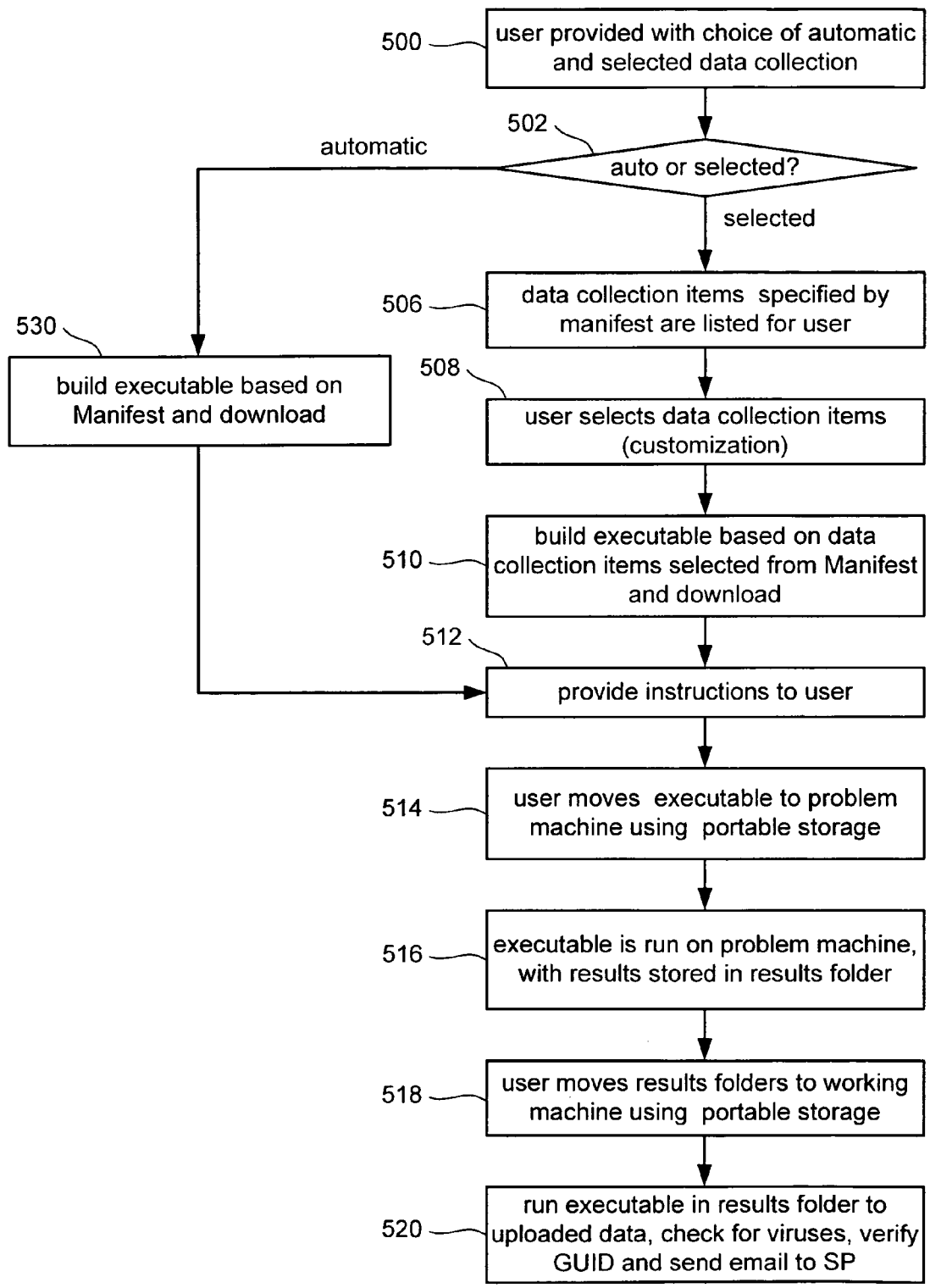
FIG. 9 is a flowchart describing one embodiment for collecting data from a remote computing device.

In step 352 of FIG. 7, the user was provided with links or another type of selection mechanism on a user interface to indicate whether the support problem was with computer being operated by the user (local computer) or a remote computer. If the user chose the remote computer link, then the remote computer process 356 is performed. FIG. 9 is a flowchart describing one embodiment of the remote computer process 356. In step 500 of FIG. 9, the user is provided with a choice of automatic or selected data collection. If the user chooses (step 502) selected data collection, then in step, all the data items specified by the manifest are listed for the user. In step 508, the user selects the data collection items in order to customize the data collection process. In step 510, ActiveX Control 6 will build an executable file(s) based on the data collection items selected from the manifest. Additionally, ActiveX Control 6 may download one or more tools and add those tools to the executable file(s). In step 512, ActiveX Control code 6 will provide instructions to the user to copy the executable to a portable storage device and bring that portable storage device to the remote computer that needs to be diagnosed. The instructions will also describe how to execute that executable file on the remote computer. In another embodiment, the executable is created by a server at Assisted Support service 10 and downloaded by ActiveX Control code 6 to the local client device 2. In either situation, the user will copy the executable to a portable storage device and move it to the problem machine (remote computer) step 514. That executable is run on the problem machine in step 516.

The executable will run the specified tools and collect the specified data. The results of running the executable (results of the tools, registry values, data values, and data files, etc.) are stored in a results folder in step 516. The user will copy the results folder to the portable storage medium and move it to the original computer used to start the data collection process in step 518 or another computer connected to the Internet. In one embodiment, when the results folder is created, a second executable will be added to results folder. That second executable will be used to upload the data to the Collection Server 40 in step 520. Collection Server 40 will check the data for viruses, verify the GUID that is uploaded with the data and send an email to the support professional indicating that the data was properly uploaded. In another embodiment, the ActiveX Control originally downloaded onto the client device 2 will be used to upload the data rather than a new executable. Once the support professional has access to the uploaded data, that data can be used to run various diagnostic engines 44 and be viewed directly by the support professional in order to diagnose the problem on the remote computer.

Figure 10:
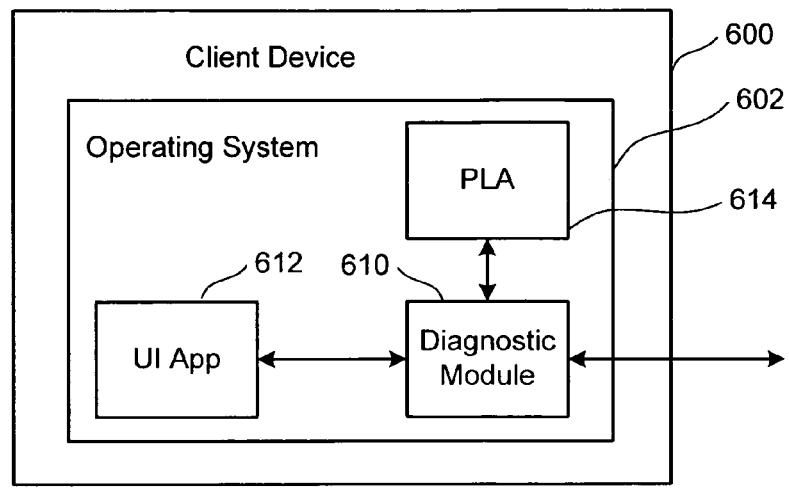
FIG. 10 is a block diagram of an embodiment of a system that includes an application for downloading diagnostic tools as part of an operating system for a computing device.

In the discussion above, ActiveX Control 4 within browser 6 acts as a channel to download tools and a data collection plan, collects the data, and uploads the data. In another embodiment, the channel for downloading tools, the collection of data and the uploading data can be provided by a support client application which is part of the operating system of the client (or remote) device. FIG. 10 is a block diagram depicting one such embodiment of a client device 600 having operating system 602. In addition to the standard operating system functionality found in operating systems known in the art, operating system 602 also includes a support client application which comprises a Diagnostic Module 610, User Interface Application 612 and Performance Logs and Alert (PLA) 614. PLA 614 is an operating system component that tracks the health of the computing system. In some embodiments, PLA 614 will include an Application Program Interface (API) that can be used to access various data values associated with the system, including registry values and other computing system values. User Interface Application 612 is used to provide a user interface to the user in order for the user to follow the progression status of the data collection process, provide the user with various choices during the data collection process, and to receive user input during the data collection process. Diagnostic Module 610 communicates with User Interface Application 612, PLA 614 and a support or other service (e.g., Assisted Support service 10, Portal Support service 12, Support 14, Tools Server 34 and Collection Server 40). In some embodiments, an operating system may be provided to a user on a CD-ROM, DVD or other portable storage device. That portable storage device will then be used to load the operating system on the computing device, for example, to a hard disk drive or flash memory for the computing device. The operating system loaded will include Diagnostic Module 10, User Interface Application 612 and PLA 614, all which will be installed as part of the operating system. In another embodiment, Diagnostic Module 610 and User Interface Application 612 can be combined to one module able to communicate with the support service as well as PLA 614. In other embodiments, Diagnostic Module 610, User Interface 612 and PLA 614 can be combined into one support client application. Other embodiments can also use more than three components.

Figure 11:
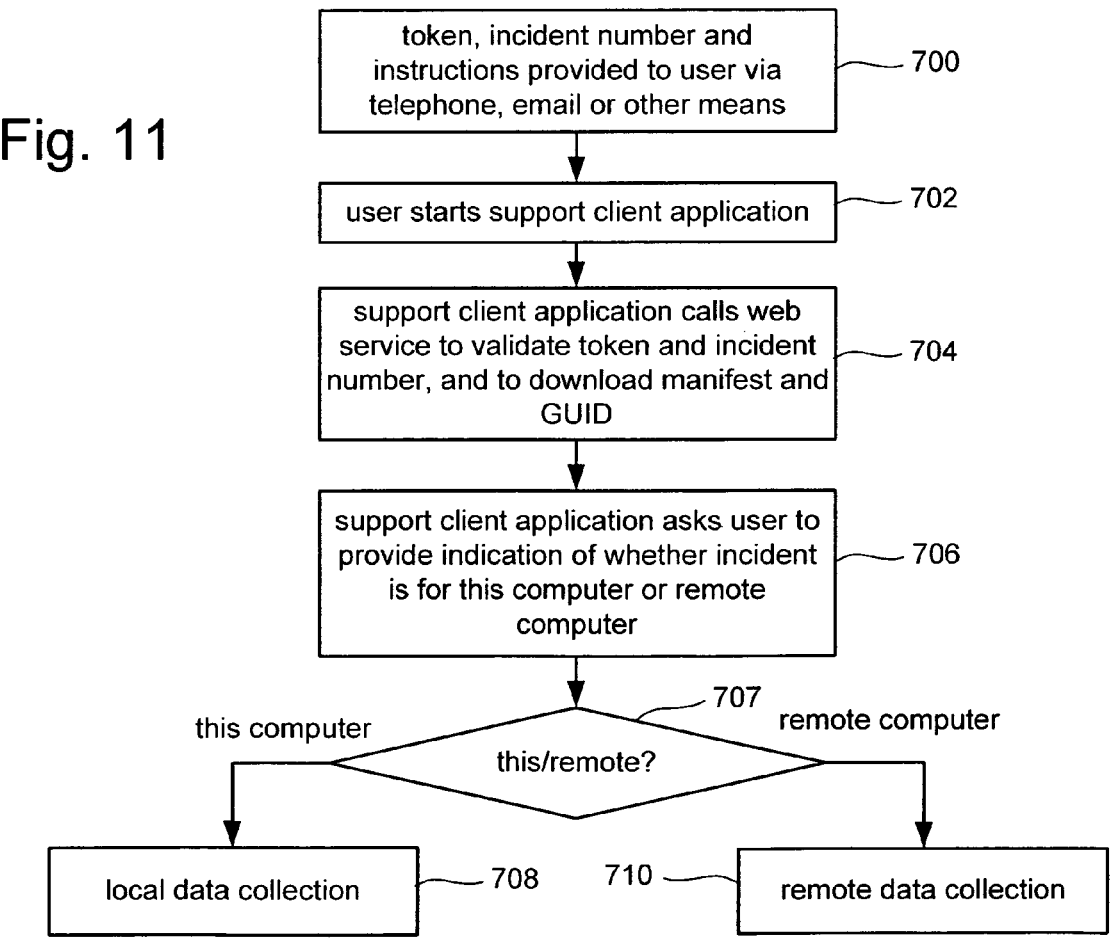
FIG. 11 is a flowchart describing one embodiment of a process for downloading tools and a data collection plan to diagnose computer problems.

FIG. 11 is a flowchart describing one embodiment of the process performed by the components of FIG. 10 in the context of the downloading of tools and a data collection plan to diagnose computer related problems, as discussed herein. The process of FIG. 11 provides a second embodiment for step 208 of FIG. 3. In step 700 of FIG. 11, a token, incident number and instructions are provided to user via telephone, email or other means. In one embodiment, the token is based on the GUID associated with the manifest. In step 702, the user starts the support client application. In one embodiment, user can double-click on (or otherwise select) an icon on the user desktop that is associated with User Interface Application 612. The starting of User Interface Application 612 will also start Diagnostic Module 610. In other embodiments, Diagnostic Module 610 will always run in the background. When support client application starts, it will provide a page for the user to type in the token and incident number. Diagnostic Module 610 will access the token and incident number (via Assisted Support 10) received in step 700. In step 704, support client application will call a Web Service 20 via Assisted Support system 10 to validate the token and incident number and to download the manifest and GUID associated with the manifest. In step 706, the support client application will ask the user to provide an indication of whether the incident is for the computer currently being worked on or a remote computer. If the user indicates that the incident is for the current computer being operated, then local data collection will be performed in step 708. If the user indicates that the incident is for a remote computer, the remote data collection process will be performed in step 710.

Figure 12:
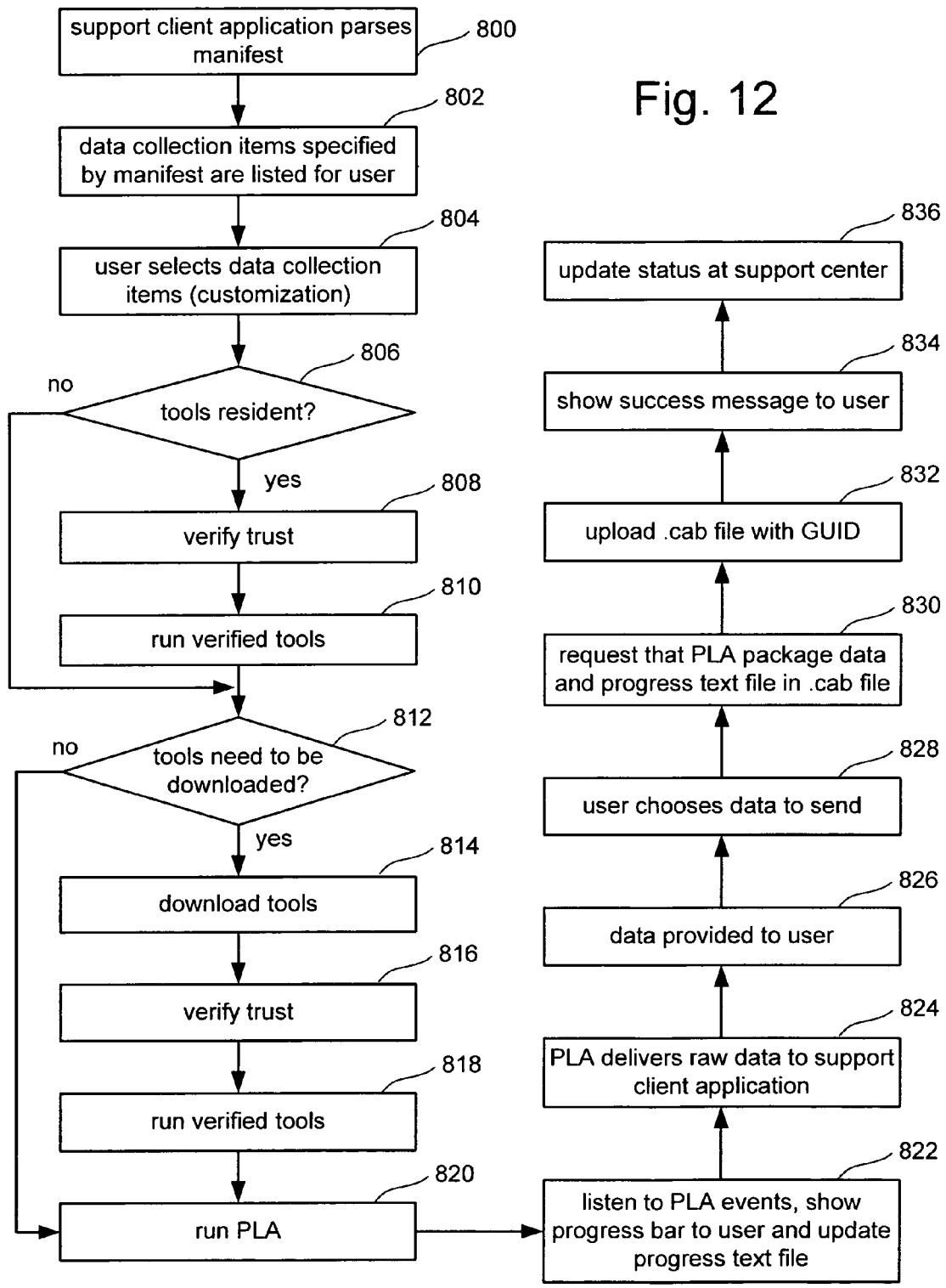
FIG. 12 is a flowchart describing one embodiment of a process for collecting data from a local computing device.

FIG. 12 is a flowchart describing one embodiment of a process performing a local data collection (step 708 of FIG. 11). In step 800 of FIG. 12, the support client application parses the manifest. In step 802, the data collection items specified by the manifest are listed to the user in the user interface. In step 804, the user selects the particular data collection items the user wants in order to customize the collection process. In some embodiments, the user is not provided with the ability to select individual data collection items. Rather, the user can choose all or nothing, or may have no choice at all. In step 806, the support client application determines whether tools selected by the user are resident on the user client device. If so, the support client application will verify the trust level of those tools. That is, in one embodiment, each of the tools downloaded will have a certificate or a signature. That certificate or signature will be verified by a verification server associated with the support service to make sure that the certificate or signature is valid. Those tools that are verified in step 808 are then run in step 810. In one embodiment, signature verification is performed for downloaded tools but not for tools resident on the user client device. In some embodiments, the sequence of execution is driven by the manifest, and resident tools are not necessarily executed before downloaded tools. Note that tools are downloaded when they are not already resident on the user client device.

After running tools, it is determined whether any additional tools need to be downloaded. Any tools that were specified by the manifest, selected by the user and not already resident on the local machine need to be downloaded. If any tools need to be downloaded (step 812), then those tools are downloaded in step 814 and the trust for the tools are verified in step 816. Those downloaded tools that have their trust verified are run in step 818. When the tools are run in step 810 and 818, they create data for collection. This data will be put into one or more files managed by Diagnostic Module 610. After running tools in step 818, Diagnostic Module 610 will request PLA 614 to acquire various data needed and specified by the manifest by communicating with PLA 614 via the API for PLA 614. If no tools were determined to be needed to be downloaded (step 812), the process skips directly to step 820. After requesting the PLA obtain the data, Diagnostic Module 610 will listen to PLA events via the API and show a progress bar to the user (via User Interface Application 612) and update a text file (progress text or XML file) which keeps a log of the progress made by PLA 614. When PLA 614 has obtained all the data, that raw data is provided to the support client application (e.g., Diagnostic Module 610). The data is then displayed to the user in step 826. The user can choose to send all the data or a subset of the data in step 828. In some embodiments, the user is not provided with the ability to choose which data to send. Rather, the user can choose all or nothing, or may have no choice at all. The data to be uploaded by the user is then sent to the PLA by Diagnostic Module 610 with a request that PLA 614 package all the data into a cab (or other format) file(s). In step 832, the .cab file is returned to Diagnostic Module 610, which then uploads it to Collection Server 40 along with the GUID in step 832. In step 834, the user is provided with a message indicating that the uploading process was successful. In step 836, the backend system will update the support database 22 and/or Support Incident Tracking 18 to indicate that the data was successfully uploaded.

Figure 13:
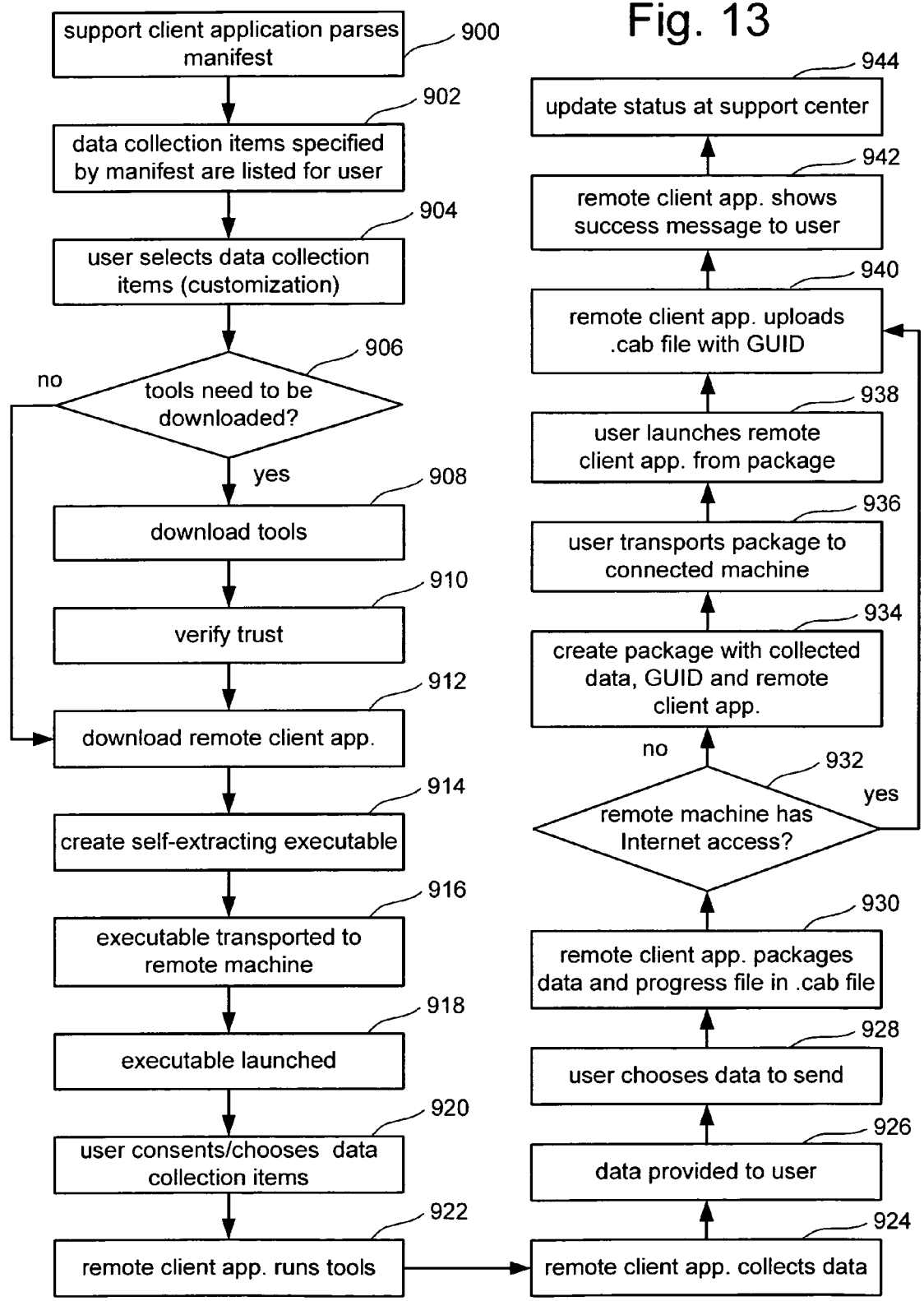
FIG. 13 is a flowchart describing one embodiment of a process for collecting data from a remote computing device.

FIG. 13 is a flowchart describing one embodiment of a process for performing the remote data collection step 710 of FIG. 11. In step 900 of FIG. 13, the support client application on the user's machine parses the manifest. In step 902, all the data collection items specified by the manifest are listed for the user to view (e.g., via User Interface Application 612). In step 904, the user selects the data items to be collected; therefore, providing customization of the data collection process. In some embodiments, the user is not provided with the ability to select individual data collection items. Rather, the user can choose all or nothing, or may have no choice at all. In step 906, it is determined whether tools need to be downloaded. If there are tools specified in the manifest, then all those tools specified must be downloaded because the system cannot know for sure what tools are already downloaded at the remote machine. The tools are downloaded in step 908 and have their trust verified in step 910. In step 912, a remote client application is downloaded from the support service system. It is not known whether the remote computer has the support client application (e.g., Diagnostic Module 610, User Interface Application 612 and/or PLA 614); therefore, a version of the support client application that can run on different operating systems should be downloaded in step 912. In step 914, the support client application on the current computer being used to do the downloading packages the downloaded remote client application, the manifest, the GUID, and the downloaded tools into a self-extracting executable in step 914.

The executable is transported to the remote machine in step 916 by the user. For example, the user may copy the executable onto a portable storage medium. In step 918, the executable is launched on the remote computer. The executable includes the remote client application. When that remote client application is launched, it will review the manifest and then list all the items for collection to the user in step 920. Note that the remote client application, which is a version of support client application, may be the same as depicted in FIG. 10 or may be a single application which is made to work on multiple operating systems. In step 920, the user will consent or choose which data collection items to proceed with. In step 922, the remote client application runs the necessary tools that were bundled with it. In step 924, the remote client application will collect the data listed in the manifest. In step 926, all the data collected (including data listed in manifest and data from the tools) will be identified to the user in step 926. The user will choose which data to upload to the support service in step 928. In some embodiments, the user is not provided with the ability to choose which data to send. Rather, the user can choose all or nothing, or may have no choice at all. In step 930, the remote client application will package together all the data to be uploaded and the progress file into a .cab file.

In step 932, it will be determined whether the remote machine has Internet access. The remote client application can test for Internet access automatically or it can ask the user. If the remote machine does not have Internet access, then in step 934 a package will be created by the remote client application. This package will include the collected data in the cab file, the GUID and a version of the remote client application. In step 936, the user will transport that package to a machine that is connected to the Internet. In step 938, the user can launch the remote client application from that package. That remote client application will then upload the .cab file with the GUID to Collection Server 40 in step 940. Note that if the remote machine did have Internet access (step 932), then the process would skip directly to step 940 and the remote machine would then upload the .cab file with the GUID. In step 942, the remote client application will show a message to the user indicating that the data was successfully uploaded to the support service. In step 944, the support service will update its status (e.g., in Support Incident Tracking 18 or Support Database 22) to indicate that data was successfully uploaded.

After data is successfully uploaded, the incident report is updated with the location of the uploaded data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for obtaining data, comprising:
    customizing a data collection plan for a particular situation on a client device;
    transmitting said customized data collection plan toward a location for said client device;
    receiving said data collection plan at said client device, said data collection plan includes a set of data collection items;
    allowing a user to select one or more of said data collection items;
    collecting data according to said selected data collection items; and
    uploading said collected data to a data store associated with a diagnostic service.

2. A method according to claim 1, further wherein said collecting data is performed by a component of an operating system on said client device.

3. A method according to claim 1, further comprising:
    downloading a set of tools to said client device, said set of tools is specified by said data collection plan.

4. A method according to claim 3, further comprising:
    receiving incident report information;
    receiving a determination that additional data is needed;
    accessing a first template from a set of templates, said customizing a data collection plan includes configuring said first template;
    receiving collected data specified by said data collection plan, at least a subset of said collected data is from said tools; and
    performing a diagnostic using said collected data.

5. A method according to claim 1, further comprising:
    receiving an indication that said data collection plan is for a remote device different than said client device; and
    downloading an executable to said client device for said remote device.

6. A method according to claim 5, further comprising:
    moving an executable and said data collection plan to said remote device;
    collecting data according to said data collection plan at said remote device;
    moving said collected data to a networked machine; and
    uploading said collected data from said networked machine.

7. A method according to claim 1, further comprising:
    allowing a user to select which of said collected data to upload; and
    uploading said selected collected data from said client device to said data store associated with a diagnostic service.

8. An apparatus, comprising:
    one or more storage devices;
    an interface; and
    one or more processors in communication with said interface and said one or more storage devices, said one or more processors perform a method comprising:
        receiving a data collection plan from outside said apparatus, said data collection plan includes a set of data collection items;
        customizing said data collection plan, said customizing includes allowing a user to select one or more of said data collection items;
        collecting data based on said customized data collection plan, said collecting data includes collecting data according to said selected data collection items; and
        uploading said collected data to a remotely located data store.

9. An apparatus according to claim 8, wherein:
    said one or more storage devices store an operating system for said apparatus; and
    said receiving a data collection plan, said customizing said data collection plan and said collecting data are performed by said operating system.

10. An apparatus according to claim 8, wherein said method further includes:
    allowing a user to select which of said collected data to upload; and
    uploading said selected data to said remote data store.

11. A method for obtaining data, comprising:
    customizing a data collection plan for a particular situation on a client device;
    transmitting said customized data collection plan toward a location for said client device;
    receiving incident report information;
    receiving a determination that additional data is needed;
    accessing a first template from a set of templates, said customizing a data collection plan includes configuring said first template;

receiving collected data specified by said data collection plan, at least a subset of said collected data is from a set of tools to said client device, said set of tools is specified by said data collection plan; and performing a diagnostic using said collected data.

12. A method according to claim 11, further comprising:

downloading said set of tools to said client device.

13. A method according to claim 11, further comprising:

collecting data at said client device based on said customized data collection plan, wherein said collecting data is performed by a component of an operating system on said client device.

* * * * *

UNITED STATES PATENT AND TRADEMARK OFFICE
CERTIFICATE OF CORRECTION

| | | |
|---|---|---|
| PATENT NO. | : 7,464,004 B2 | |
| APPLICATION NO. | : 11/377997 | |
| DATED | : December 9, 2008 | |
| INVENTOR(S) | : Nicholas Das et al. | |

It is certified that error appears in the above-identified patent and that said Letters Patent is hereby corrected as shown below:

In column 15, line 54, in Claim 2, after "claim 1," delete "further".

Signed and Sealed this
Tenth Day of May, 2011

David J. Kappos
*Director of the United States Patent and Trademark Office*